Patented Apr. 11, 1950

2,503,823

UNITED STATES PATENT OFFICE 2,503,823

PROCESS FOR PREPARING VAT DYESTUFFS OF THE DIBENZANTHRONE AND ISODIBENZANTHRONE SERIES

Wilhelm Huber, Cincinnati, Ohio, and Karl Krauer, Basel, Switzerland; said Krauer assignor to Ciba Limited, Basel, Switzerland, a Swiss firm No Drawing. Application March 20, 1947, Serial No. 736,114

17 Claims. (Cl. 260—355)

This invention relates to vat dyestuffs of the etherified hydroxydibenzanthrone and hydroxyisodibenzanthrone series.

It is a primary object of this invention to improve and simplify the process and provide for a safe method of preparing ethers of the hydroxydibenzanthrone and -isodibenzanthrone series, commonly known as dyestuffs of the "jade green" series.

It is a further object of this invention to provide for a new and economical way of producing reduction products of oxidized dibenzanthrones and -isodibenzanthrones and for the safe alkylation of these reduction products.

It is also an object of this invention to provide a novel and safe method for producing dyestuffs of the "jade green" series by using dioxo-dibenzanthrone as a starting material without previous reduction with inorganic reducing agents such as sodium bisulfite, sodium hydrosulfite, sodium sulfide, etc., and to provide an efficient method for complete alkylation of partly reduced dioxodibenzanthrones or partly, by contact with air, reoxidized dihydroxy-dibenzanthrones or -isodibenzanthrones, i. e. mixtures of dioxo-dibenzanthrones and dihydroxy-dibenzanthrones or -isodibenzanthrones, thereby eliminating the hazards heretofore experienced in the alkylation of oxidized dibenzanthrones and -isodibenzanthrones.

It is a known fact that among the dialkoxy-dibenzanthrones there are some valuable vat dyestuffs, as for example, diethoxy-dibenzanthrones and, more especially, dimethoxy-dibenzanthrone. In practice, these dyestuffs are prepared by oxidizing, for instance, with manganese dioxide, dibenzanthrone or dibenzanthronyl, dissolved in concentrated sulfuric acid, reducing the resultant dioxo-dibenzanthrone (dibenzanthrone-Bz-2:Bz-2'-quinone) into the corresponding dioxy compound and alkylating the latter, for example, by treatment with ethylating or preferably methylating agents.

The method ordinarily followed consists in introducing, when the oxidation is completed, the concentrated sulfuric acid solution of the dioxo compound into an aqueous solution of a reducing agent, for example an alkali bisulfite, thus combining the two required operations of the introduction into water and the reduction of the dioxo compound into the dihydroxy compound. After this, the resultant dioxy compound is alkylated.

The separation of the dioxo compound from the sulfuric acid oxidation medium being brought about by the introduction into water and an aqueous filter residue of the dioxo compound or dihydroxy compound thus being obtained, and the alkylation having to be carried out in an organic, preferably high boiling anhydrous medium, there ensues the necessity of removing the water by drying the wet filter residue at a suitable stage of the process or by distilling it in a high boiling solvent prior to the alkylation.

The observation has repeatedly been made that the aforementioned process is unreliable and uncontrollable as in many cases it yields, for example, considerably bluer dyestuffs or even dyestuffs which are of considerably inferior fastness.

It is an object of the present invention to provide for effective means to overcome this disadvantage. The invention is based on the observation that the frequent ill success in practice is due to a partial oxidation into the dioxo compound which may take place when the dihydroxy-dibenzanthrone prepared in an aqueous medium is dried or that it is due to an incomplete reduction of the dioxo compound into the dihydroxy compound in an aqueous medium.

It has now been found that a good way of preparing dialkoxy-dibenzanthrones from dihydroxy-dibenzanthrones is to carry out the treatment, in an organic medium, with an alkylating agent in the presence of a reducing agent having mild reducing properties, preferably one that is soluble in an organic solvent.

The dihydroxy-dibenzanthrones serving as starting materials in the present process can be obtained in the usual manner by the oxidation of dibenzanthrone with manganese dioxide and sulfuric acid, introduction of the resultant reaction mixture into water containing a suitable reducing agent, and filtering and drying of the so obtained dioxy compound. Because of the addition of a reducing agent, the starting materials used may, in addition to the dihydroxy-dibenzanthrone, contain any quantity, however great, of dioxo-dibenzanthrone or similar compounds which contain less hydrogen than the desired dihydroxy-dibenzanthrone. It is thus absolutely unnecessary when carrying out the reduction or when drying the product of the reduction, to take any steps with a view to obtaining the dihydroxy-dibenzanthrone used as starting material for the alkylation reaction in a very pure state. This means a considerable simplification of the process steps concerned. One may go even as far as to use wholly unreduced dioxo-dibenzanthrone in the present process. However, this modification of the process is not usually of advantage because at least a partial reduction of the dioxo-dibenzanthrone obtained by the oxidation can be brought about simultaneously with the introduction into water with the aid of very cheap reducing agents, such as sodium bisulfite.

Examples of organic solvents in which the mixtures of dioxo- and dihydroxy-dibenzanthrones are treated with alkylating agents are trichlorobenzene, dichlorobenzene, nitrobenzene, or mixtures of such solvents. As alkylating agents there may be mentioned, for example, diethyl sulfate, dimethyl sulfate, ethyl chloride, methyl chloride and also the ethyl ester and especially the methyl ester of para-toluene sulfonic acid.

Reducing agents which can be added to the alkylating mixture under the present process are, for example, tetrahydronaphthalene; hydrazine or its substitution products, for example methyl- or phenylhydrazine; degradation products of starch, such as dextrose and, particularly, compounds that contain one or more aromatically-bound OH-groups, more commonly called phenolic OH groups, which latter term is intended to comprise not only OH-groups bound to a benzene radical but also other aromatically bound hydroxyl groups, such as naphtholic OH-groups, especially such compounds which have, due to the presence of such OH-groups, mild reducing properties and have not lost such reducing properties by the presence of other substituents with oxidizing properties, as for instance in the case of some phenols that contain nitro groups. The following organic compounds are especially suitable: aromatic phenols and alkyl phenols and their derivatives and substitution products such as phenol, o-, m-, p-cresol, xylenols; aminophenols, such as o-, m-, p-amino phenol; halogenphenols, such as o-, m-, p-chlorophenol; sulfonic acids of these compounds above mentioned, and alkali metal salts and derivatives thereof such as phenol sulfonic acid and phenol sulfonic acid alkyl esters; dihydroxybenzols and their derivatives and substitution products such as pyrocatechol, resorcinol, hydroquinone, and their partly etherified or esterified derivatives which still have one free OH-group, such as guaiacol, vanillin, etc., and their derivatives and substitution products; trihydroxybenzols such as phloroglucinol, pyrogallic acid, hydroxyhydroquinone and their derivatives and substitution products and their partly etherified or esterified derivatives, which have still one or more free OH-groups; hydroxybenzol carboxylic acids, such as cresotinic acids, especially those hydroxybenzol carboxylic acids, such as protocatechuic acid, gallic acid, and tannin, which lose their carboxylic group on heating thereby producing hydroxybenzols; naphthols especially alpha- and beta-naphthol and their derivatives and substitution products such as halogenated naphthols, alkylnaphthols, amino naphthols, also sulfonated derivatives thereof; hydroxynaphthalene carboxylic acids; dihydroxy- and polyhydroxynaphthalenes and their derivatives and substitution products; hydrogenated naphthols such as dihydronaphthols, tetrahydronaphthols, etc.; cyclic and heterocyclic compounds with phenolic OH-groups such as dihydroresorcinol, dihydroxyquinoline, etc.

These above-mentioned compounds with phenolic OH-groups can also be used in the form of their salts especially alkali metal salts (including $NH_4$ salts) such as for instance sodium- or potassium-phenolate or naphtholate, thereby combining properties of the phenolic compound with those of the acid absorbing agent. The properties of the phenolic compound can be further combined in one substance with the alkylating agent by using for instance alkyl esters of aromatic or cyclic or heterocyclic sulfonic acids which contain phenol OH-groups, such as phenol-sulfonic acid alkyl esters, naphtholsulfonic acid alkyl esters. In these phenolic compounds which possess several phenolic OH-groups, all or only part of the OH-groups need be in the form of alkali metal salts.

The following examples illustrate the invention without, however, restricting it in any way. The parts are by weight, the percentages mean per cent by weight and the temperatures are indicated in degrees centigrade.

Example 1

7.5 parts of dioxodibenzanthrone (produced for instance according to U. S. Pat. 1,564,423, Example 13, or U. S. Pats. 1,866,501 or 1,910,603) are sludged up with 250 parts of trichlorobenzol or nitrobenzol and 4 parts of phenol (or a crude mixture of phenols, cresols, and xylenols such as is known under the name of 70% phenol) and the mixture is heated up to 170–180° C. 20 parts of $Na_2CO_3$, $K_2CO_3$, or some other suitable acid-absorbing agent are added and 20 parts of p-toluene sulfonic acid methyl ester or a corresponding amount of dimethyl sulfate are introduced dropwise, while stirring. The alkylation proceeds very rapidly as shown by the immediate appearance of the brilliant blue color of the alkylation mass as soon as some alkylating agent has been added. After some heating at boiling temperature the reaction is complete. The mass is cooled down, filtered, washed with some more trichlorobenzol. Worked up in the customary way for instance by revatting and air oxidation, a dyestuff is obtained which dyes cotton in very brilliant pure green shades that are fast to dilute mineral acid.

Example 2

7.5 parts of dioxodibenzanthrone are heated to 170–180° C. with 250 parts of trichlorobenzol and 4 parts of hydroquinone and 20 parts of $Na_2CO_3$ or the equivalent amount of $K_2CO_3$. 15 parts of dimethyl sulfate or the corresponding amount of p-toluene sulfonic acid methyl ester are slowly added and thereafter the mass is heated to boiling for a short time until a test with dilute mineral acid shows complete alkylation. The alkylation proceeds very rapidly. Worked up as previously described the product dyes cotton brilliant green shades.

Example 3

10 parts of a partly reduced dioxodibenzanthrone or dihydroxydibenzanthrone that has been partly re-oxidized by contact with air, i. e., a mixture of dioxo- and dihydroxy-product as such produced by the bisulfite reduction method, are heated up to 170–180° C. with 250 parts of trichlorobenzol and an amount of a phenolic compound sufficient for mild re-reduction, such as phenol, cresols, chlorophenol, hydroquinone, naphthols, etc. 20 parts of soda ash or a similar acid-absorbing agent are added and 20 parts of p-toluene sulfonic acid methyl ester or the equivalent amount of dimethyl sulfate are slowly dropped in. The alkylation goes rapidly to completion and after some heating at boiling temperature the mass can be worked up. The product so obtained dyes cotton brilliant green shades fast to dilute mineral acid.

Example 4

7.5 parts of dioxodibenzanthrone are dissolved in 100 parts of concentrated sulfuric acid. 4 parts of a phenol or naphthol are added to this solution. The reduction proceeds almost instantaneously, the color changing from the brown-red of the dioxo compound to the violet-red of the dihydroxy product. The solution is drowned in ice water and the dark blue product filtered and washed neutral. It dissolves, when dry, in concentrated sulfuric acid with violet-red color and can be easily alkylated to completion according to the before-described method, with or without the presence of further amounts of phenolic substances. The product so obtained gives brilliant green shades on cotton, fast to dilute acid.

Example 5

9 parts of dioxodibenzanthrone and 10 parts of sodium or potassium phenolate are sludged up in 250 parts of trichlorobenzol and heated to 170–180° C. When all the moisture has been driven out, 20 parts of p-toluene sulfonic acid methyl ester or the equivalent amount of dimethyl sulfate are slowly added and the mass heated for some more time to boiling. The alkylation is finished in a short time as shown by test with dilute mineral acid. Worked up as previously the dyestuff gives brilliant green shades on cotton.

Example 6

10 parts of dihydroxydibenzanthrone are heated to 170–180° C. with 250 parts of trichlorobenzol and 4.5 parts of alpha-naphthol. 20 parts of soda ash are added and 20 parts of p-toluene sulfonic acid methyl ester or the equivalent amount of dimethyl sulfate are dropped in. After some heating at boiling temperature the mass is worked up. The product dyes brilliant green shades on cotton fast to dilute mineral acid. The alpha-naphthol may be replaced, if desired, by an equivalent amount of phenol.

In the foregoing examples, the dioxodibenzanthrone may be replaced by an equivalent amount of the dihydroxydibenzanthrone, dihydroxyisodibenzanthrone or dioxo-isodibenzanthrone, whereupon the process may be carried out in essentially analogous manner to give essentially similar results. In Example 3, the mixture of dioxo- and dihydroxy-products may be similarly replaced by the corresponding mixture of iso-products. This is exemplified by the following example.

Example 7

7.5 parts of dihydroxyisodibenzanthrone are heated to 170–180° C. with 250 parts of trichlorobenzol and 4 parts of phenol and 20 parts of sodium carbonate. 20 parts of p-toluene sulfonic acid methyl ester are slowly added, whereupon the mass is heated to boiling for a short time until a test with dilute mineral acid shows complete alkylation. Worked up as previously described, the product dyes cotton in greenish blue to blue shades.

The dihydroxyisodibenzanthrone used in this example may be replaced by the equivalent amount of dioxoisodibenzanthrone with like results.

Example 8

10 parts of dioxo-dibenzanthrone are stirred into 200 parts of tetrahydro-naphthalene (tetraline) and, after the addition of 13 parts of calcined sodium carbonate and 15 parts of para-toluene sulfonic acid methyl ester, heated to the boil. The mixture is maintained at the boiling temperature for about 5 hours, allowed to cool to about 70°, filtered with suction and the residue is washed with some tetraline. In order to remove the solvent, the filter residue is distilled with steam.

The resultant dimethoxy-dibenzanthrone dissolves in concentrated sulfuric acid to give a violet coloration and dyes cotton from a blue vat pure bluish-green tints which are not changed in appearance by dilute acids.

When using para-toluene sulfonic acid-ethyl ester under the same conditions, diethoxy-dibenzanthrone is obtained which makes blue-green dyeings.

Example 9

A suspension in 200 parts of trichlorobenzene of 10 parts of dihydroxy-dibenzanthrone still containing some unreduced dioxo-dibenzanthrone, 2 parts of hydrazine sulfate, 10 parts of calcined sodium carbonate and 15 parts of para-toluene sulfonic acid ethyl ester is heated to the boil while stirring and maintained at the boiling temperature for several hours. After having allowed the mass to cool to 25°, it is filtered and the residue washed with trichlorobenzene before it is freed from the solvent by steam distillation. The diethoxy-dibenzanthrone is obtained in crystalline form.

The dyestuff dissolves in concentrated sulfuric acid to give a violet-red coloration and dyes cotton from a blue vat pure blue-green tints.

A similar effect is produced if, for example, the same quantity of dextrose or sodium formiate is used in lieu of hydrazine sulfate.

Example 10

10 parts of an incompletely reduced dioxo-dibenzanthrone, i. e. of a mixture of dihydroxy-benzanthrone and dioxodibenzanthrone are heated to the boil for several hours in 200 parts of tetrahydro-naphthalene with 15 parts of calcined sodium carbonate and 20 parts of para-toluene sulfonic acid ethyl ester. After allowing the mass to cool to room temperature, the dyestuff is isolated in the usual manner.

The resultant diethoxy-dibenzanthrone dyes cotton pure blue-green tints fast to acids.

This application is a continuation-in-part of application Serial No. 657,330, filed March 26, 1946 (now abandoned).

What we claim is:

1. The process for the preparation of an etherified dibenzanthrone compound which comprises reacting a member selected from the group consisting of oxo-dibenzanthrones, oxo-isodibenzanthrones, hydroxy-dibenzanthrones, hydroxy-isodibenzanthrones, mixtures of oxo-dibenzanthrones and hydroxy-dibenzanthrones and mixtures of oxo-isodibenzanthrones and hydroxy-isodibenzanthrones, which member is free from further substituents, with an alkylating agent in a high-boiling solvent which is inert to the alkylating reaction, in the presence of an organic reducing agent, which is soluble in the said high-boiling solvent and which is selected from the group consisting of a hydrazine wherein at the most one hydrogen atom is replaced by a hydrocarbon radical of at most six carbon atoms, tetrahydronaphthalene, and aromatic, hydroaromatic and heterocyclic compounds free from substituents with oxidizing action and containing at least one phenolic hydroxyl group.

2. The process for the preparation of an etherified dibenzanthrone compound which comprises reacting a member selected from the group consisting of oxo-dibenzanthrones, oxo-isodibenzanthrones, hydroxy-dibenzanthrones, hydroxy-isodibenzanthrones, mixtures of oxodibenzanthrones and hydroxy-dibenzanthrones and mixtures of oxo-isodibenzanthrones and hydroxy-isodibenzanthrones, which member is free from further substituents, with an alkylating agent in a high-boiling solvent which is inert to the alkylating reaction, in the presence of a hydrazine wherein at the most one hydrogen atom is replaced by a hydrocarbon radical of at most six carbon atoms.

3. The process for the preparation of an etherified dibenzanthrone compound which comprises reacting a member selected from the group consisting of oxo-dibenzanthrones, oxo-isodibenzanthrones, hydroxy-dibenzanthrones, hydroxy-isodibenzanthrones, mixtures of oxo-dibenzanthrones and hydroxy-dibenzanthrones and mixtures of oxo-isodibenzanthrones and hydroxy-isodibenzanthrones, which member is free from further substituents, with an alkylating agent in a high-boiling solvent which is inert to the alkylating reaction, in the presence of tetrahydronaphthalene.

4. The process for the preparation of an etherified dibenzanthrone compound which comprises reacting a member selected from the group consisting of oxo-dibenzanthrones, oxo-isodibenzanthrones, hydroxy-dibenzanthrones, hydroxy-isodibenzanthrones, mixtures of oxo-dibenzanthrones and hydroxy-dibenzanthrones and mixtures of oxo-isodibenzanthrones and hydroxy-isodibenzanthrones, which member is free from further substituents, with an alkylating agent in a high boiling solvent which is inert to the alkylating reaction in the presence of a purely aromatic compound containing at least one phenolic hydroxyl group and at most two rings and which is otherwise free from substituents.

5. The process of producing Bz-2:Bz-2'-dimethoxy dibenzanthrone which comprises reacting a mixture of Bz-2:Bz-2'-dioxodibenzanthrone and Bz-2:Bz-2'-dihydroxydibenzanthrone with a methylating agent in the presence of an acid-absorbing agent and of tetrahydronapthalene.

6. The process of producing Bz-2:Bz-2'-dimethoxy dibenzanthrone which comprises reacting a mixture of Bz-2:Bz-2'-dioxo-dibenzanthrone and Bz-2:Bz-2'-dihydroxydibenzanthrone with para-toluene sulfonic acid methyl ester in the presence of an acid-absorbing agent and of tetrahydronaphthalene.

7. The process of producing Bz-2:Bz-2'-dimethoxy dibenzanthrone which comprises reacting a mixture of Bz-2:Bz-2'-dioxo-dibenzanthrone and Bz-2:Bz-2'-dihydroxydibenzanthrone with para-toluene sulfonic acid methyl ester in the presence of an alkali metal carbonate and of tetrahydronaphthalene.

8. The process for the preparation of an etherified dibenzanthrone compound which comprises reacting Bz-2:Bz-2'-dioxodibenzanthrone with an alkylating agent in a high-boiling solvent which is inert to the alkylating reaction in the presence of a hydrazine wherein at the most one hydrogen atom is replaced by a hydrocarbon radical of at most six carbon atoms.

9. The process for the preparation of an etherified dibenzanthrone compound which comprises reacting Bz-2:Bz-2'-dioxodibenzanthrone with an alkylating agent in a high-boiling solvent which is inert to the alkylating reaction in the presence of tetrahydronaphthalene.

10. The process for the preparation of an etherified dibenzanthrone compound which comprises reacting Bz-2:Bz-2'-dioxodibenzanthrone with an alkylating agent in a high-boiling solvent which is inert to the alkylating reaction in the presence of a purely aromatic compound containing at least one phenolic hydroxyl group and at the most two rings and which is otherwise free from substituents.

11. The process for the preparation of an etherified dibenzanthrone compound which comprises reacting a mixture of Bz-2:Bz-2'-dihydroxydibenzanthrone and Bz-2:Bz-2'-dioxodibenzanthrone with an alkylating agent in a high-boiling solvent which is inert to the alkylating reaction in the presence of a hydrazine wherein at the most one hydrogen atom is replaced by a hydrocarbon radical of at most six carbon atoms.

12. The process for the preparation of an etherified dibenzanthrone compound which comprises reacting a mixture of Bz-2:Bz-2'-dihydroxydibenzanthrone and Bz-2:Bz-2'-dioxodibenzanthrone with an alkylating agent in a high-boiling solvent which is inert to the alkylating reaction in the presence of tetrahydronaphthalene.

13. The process for the preparation of an etherified dibenzanthrone compound which comprises reacting a mixture of Bz-2:Bz-2'-dihydroxydibenzanthrone and Bz-2:Bz-2'-dioxodibenzanthrone with an alkylating agent in a high-boiling solvent which is inert to the alkylating reaction in the presence of a purely aromatic compound containing at least one phenolic hydroxyl group and at the most two rings and which is otherwise free from substituents.

14. The process for the preparation of Bz-2:Bz-2'-dimethoxydibenzanthrone which comprises reacting a mixture of Bz-2:Bz-2'-dihydroxydibenzanthrone and Bz-2:Bz-2'-dioxodibenzanthrone with a methylating agent in a high boiling solvent which is inert to the methylating reaction in the presence of an acid-absorbing agent and of a hydrazine wherein at the most one hydrogen atom is replaced by a hydrocarbon radical of at most six carbon atoms.

15. The process for the preparation of Bz-2:Bz-2'-dimethoxydibenzanthrone which comprises reacting a mixture of Bz-2:Bz-2'-dihydroxydibenzanthrone and Bz-2:Bz-2'-dioxodibenzanthrone with a methylating agent in a high boiling solvent which is inert to the methylating reaction in the presence of an acid-absorbing agent and of a purely aromatic compound containing at least one phenolic hydroxyl group and at the most two rings and which is otherwise free from substituents.

16. The process for the preparation of Bz-2:Bz-2'-dimethoxydibenzanthrone which comprises reacting a mixture of Bz-2:Bz-2'-dihydroxydibenzanthrone and Bz-2:Bz-2'-dioxodibenzanthrone with para-toluenesulfonic acid methyl ester in a high boiling solvent which is inert to the methylating action of the said methyl ester, in the presence of an alkali metal carbonate and of hydrazine sulfate.

17. The process for the preparation of Bz-2:Bz-2'-dimethoxydibenzanthrone which comprises reacting a mixture of Bz-2:Bz-2'-dihydroxydibenzanthrone and Bz-2:Bz-2'-dioxodibenzanthrone with para-toluenesulfonic acid methyl ester in a high boiling solvent which is inert to the methylating action of the said methyl ester in the presence of an alkali metal carbonate and 1-naphthol.

WILHELM HUBER.
KARL KRAUER.

REFERENCES CITED

The following references are of record in the file of this patent:

UNITED STATES PATENTS

| Number | Name | Date |
|---|---|---|
| 2,042,414 | Sobatzki et al. | May 26, 1936 |

FOREIGN PATENTS

| Number | Country | Date |
|---|---|---|
| 147,851 | Germany | Dec. 16, 1903 |
| 789,451 | France | May 2, 1935 |

OTHER REFERENCES

Houben, "Die Methoden der Organischen Chemie" (3rd German ed. 1925), vol. 2, pp. 358, 359, 448, 450.

Chemical Abstracts, vol. 32 (1938), Column 2531.